(12) United States Patent
Takahashi et al.

(10) Patent No.: US 9,016,142 B2
(45) Date of Patent: Apr. 28, 2015

(54) COLLISION DETECTION DEVICE

(75) Inventors: Hiroyuki Takahashi, Aichi (JP); Takatoshi Tanabe, Ichinomiya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 580 days.

(21) Appl. No.: 13/133,689

(22) PCT Filed: Dec. 16, 2009

(86) PCT No.: PCT/JP2009/070992
§ 371 (c)(1), (2), (4) Date: Jun. 9, 2011

(87) PCT Pub. No.: WO2010/071156
PCT Pub. Date: Jun. 24, 2010

(65) Prior Publication Data
US 2011/0239789 A1  Oct. 6, 2011

(30) Foreign Application Priority Data

Dec. 16, 2008 (JP) .................................. 2008-319897

(51) Int. Cl.
*G01L 5/00* (2006.01)
*B60R 19/48* (2006.01)
*B60R 21/0136* (2006.01)

(52) U.S. Cl.
CPC ............. *G01L 5/0052* (2013.01); *B60R 19/483* (2013.01); *B60R 21/0136* (2013.01)

(58) Field of Classification Search
USPC ........... 180/274, 312; 296/187.03; 73/114.18, 73/862.581
See application file for complete search history.

(56) References Cited

U.S. PATENT DOCUMENTS 6,561,301 B1  5/2003 Hattori et al.

7,806,222 B2 * 10/2010 Takahashi et al. ............ 180/274
(Continued)

FOREIGN PATENT DOCUMENTS

DE  10 2005 012 949  9/2006
DE  10 2005 046 928  4/2007
(Continued)

OTHER PUBLICATIONS

International Search Report in International Application No. PCT/JP2009/070992; Mailing Date: Mar. 23, 2010.
(Continued)

*Primary Examiner* — Laura Martin
*Assistant Examiner* — Irving A Campbell
(74) *Attorney, Agent, or Firm* — Finnegan, Henderson, Farabow, Garrett & Dunner, LLP

(57) ABSTRACT

A collision detection device which can determine in a short time a collision to each portion of a chamber member in the longitudinal direction thereof and which is highly reliable. A collision determination system (10) is provided with: a chamber member (20) which is disposed with the longitudinal direction thereof aligned with the vehicle width direction, has a pressure chamber (22) formed therein, and is provided forward of bumper reinforcement (14); a pair of pressure sensors (24) which is provided to the chamber member (20) at positions spaced from each other in the longitudinal direction thereof and outputs a signal corresponding to a variation in the pressure within the pressure chamber (22); and a collision determination ECU (26). The ECU (26) determines that a collision has occurred if the value of detection by either of the pair of pressure sensors (24) is greater than a first threshold value and, at the same time, the value of detection by the other of the pair is greater than a second threshold value which is set to be greater than the first threshold value.

2 Claims, 7 Drawing Sheets

(56) References Cited

U.S. PATENT DOCUMENTS

| | | | |
|---|---|---|---|
| 7,868,748 B2* | 1/2011 | Kiribayashi | 340/436 |
| 2007/0227797 A1 | 10/2007 | Takahashi et al. | |
| 2008/0315598 A1* | 12/2008 | Takafuji et al. | 293/117 |

FOREIGN PATENT DOCUMENTS

| | | |
|---|---|---|
| DE | 603 14 907 | 3/2008 |
| JP | 11-310095 | 11/1999 |
| JP | 2005-538881 | 12/2005 |
| JP | 2006-512245 | 4/2006 |
| JP | 2006-117157 | 5/2006 |
| JP | 2007-183100 | 7/2007 |
| JP | 2007-290682 | 11/2007 |
| JP | 2007-290689 | 11/2007 |
| JP | 2008-230503 | 10/2008 |
| WO | WO 03/066385 | 8/2003 |
| WO | WO 2004/058545 | 7/2004 |

OTHER PUBLICATIONS

Applicant's Reply to Written Opinion dated Mar. 23, 2010 in International Application No. PCT/JP2009/070992.
Office Action issued in German Appl. No. 11 2009 003 176.5, dated Sep. 19, 2013.

* cited by examiner

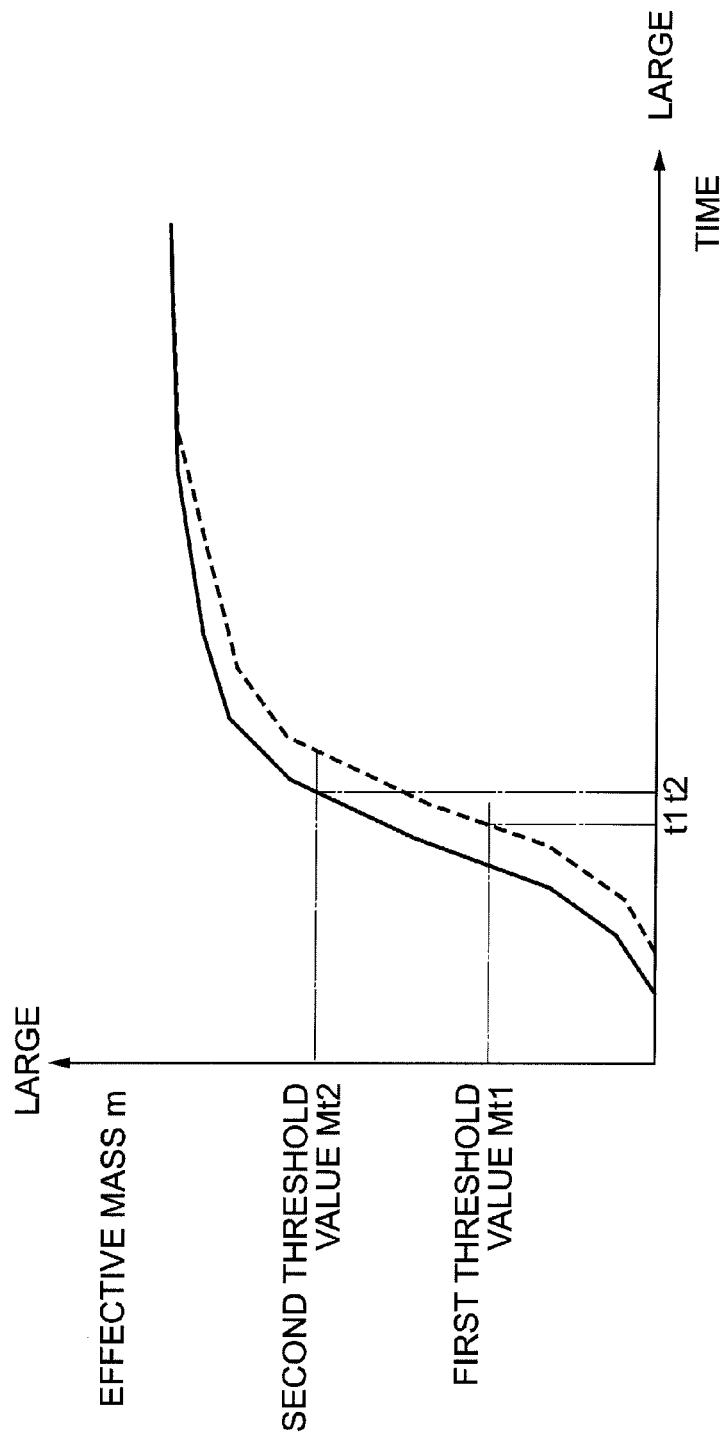

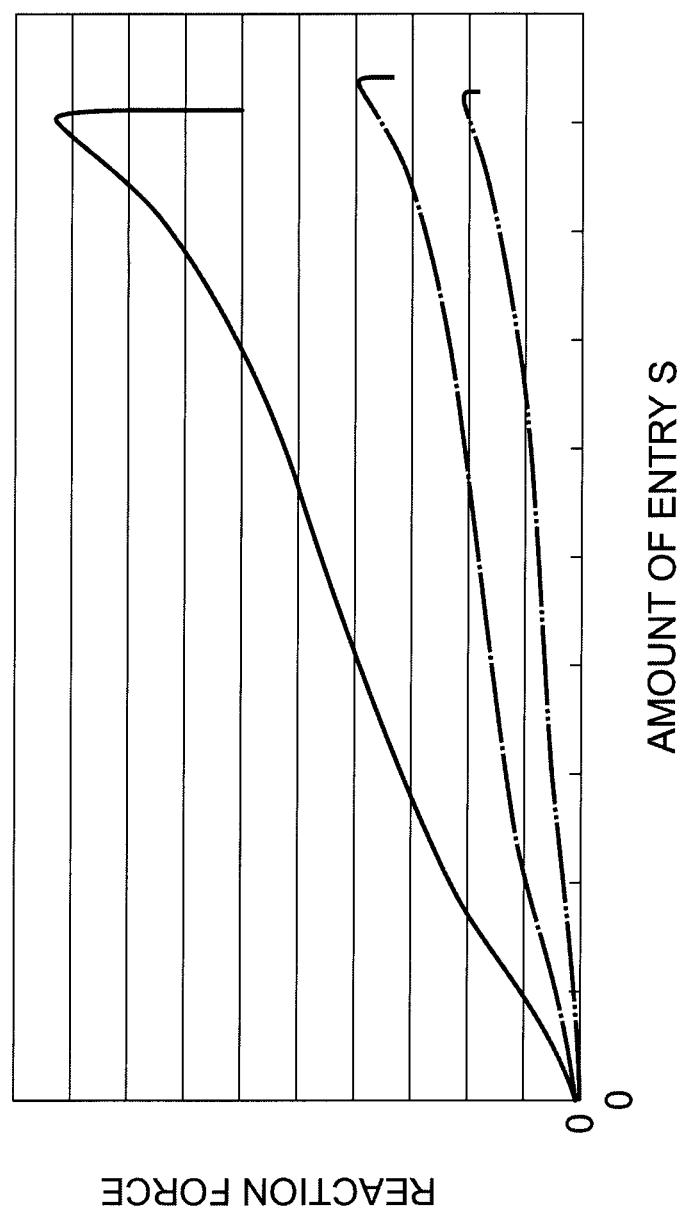

COLLISION DETECTION DEVICE

TECHNICAL FIELD

The present invention relates to a collision detection device for detecting a collision to a vehicle in which the system is applied.

BACKGROUND ART

There is known a vehicle collision discriminating device where a collision sensing tube filled with an incompressible fluid is inserted and placed between a hard shock absorbing material and a soft shock absorbing material inserted inside a front bumper, two pressure sensors or pressure switches are disposed apart from each other in the lengthwise direction of the collision sensing tube, and the device determines a collision on the basis of output signals from these two pressure sensors or pressure switches (e.g., see Japanese Patent Application Laid-Open (JP-A) No. 11-310095 (FIG. 19 and FIG. 27)). In addition, there are known the technologies described in JP-A No. 2007-290689, JP-A No. 2006-117157, JP-A No. 2005-538881, and JP-A No. 2007-290682.

DISCLOSURE OF THE INVENTION

Problem that the Invention is to Solve

However, redundancy is not considered in the conventional technologies described above, and there is room for improvement from the standpoint of the reliability of collision determination.

In consideration of the above-described facts, it is an object of the present invention to obtain a collision detection device that can determine in a short amount of time a collision to each lengthwise direction section of a chamber member and whose reliability is high.

Means for Solving the Problem

A collision detection device pertaining to a first aspect of the present invention includes: a chamber member that is made long in a vehicle width direction, whose inside is made into a pressure chamber, and which is placed on an outer side in a vehicle front-rear direction with respect to a bumper frame member; a pair of pressure detectors that are placed in positions apart from each other in the lengthwise direction of the chamber member and output signals corresponding to pressure changes inside the pressure chamber; and a collision determination unit that determines that a collision has occurred when the detection value resulting from either one of the pair of pressure detectors is larger than a first threshold value and the detection value resulting from the other of the pair of pressure detectors is larger than a second threshold value set to a large value with respect to the first threshold value.

According to the above-described aspect, when a collision occurs from the outer side in the vehicle front-rear direction toward the bumper frame member, the chamber member is crushed and the pressure in the pressure chamber rises. This pressure (change) is detected by the pair of pressure detectors. The collision determination unit determines that a collision has occurred when the detection value of one of the pressure detectors exceeds the first threshold value and the detection value of the other of the pressure detectors exceeds the second threshold value.

Here, in the present collision detection device, the two pressure detectors are placed apart from each other in the lengthwise direction of the chamber member, so the pressure detectors become positioned in positions close from each section in the lengthwise direction of the chamber member. The detection values of the pressure detectors accompanying deformation of the chamber member rise in a shorter amount of time the closer the pressure detectors are positioned to the collision position, so it becomes possible to determine a collision in a short amount of time no matter which position in the lengthwise direction of the chamber member the collision body has impacted. Further, the detection values of the pair of pressure detectors are both used for collision determination, so redundancy is ensured. For this reason, the present collision detection device is prevented from erroneously determining a collision because of a failure or the like of one of the pressure detectors, for example, and its reliability is high.

In this way, the collision detection device pertaining to the above-described aspect can determine in a short amount of time a collision to each lengthwise direction section of the chamber member and its reliability is high.

In the above-described aspect, the collision detection device may be given a configuration where the pair of pressure detectors are placed symmetrically with respect to a lengthwise direction central section of the chamber member such that, when a collision from the outer side in the vehicle front-rear direction toward the bumper frame member has occurred, the detection value resulting from the pressure detector of the pair of pressure detectors that is positioned closer to the collision position reaches the second threshold value after the detection value resulting from the pressure detector of the pair of pressure detectors that is positioned farther away from the collision position has reached the first threshold value, and the collision determination unit is configured to determine that a collision has occurred when the detection value resulting from the pressure detector of the pair of pressure detectors that is positioned farther away from the collision position is larger than the first threshold value and the detection value resulting from the pressure detector of the pair of pressure detectors that is positioned closer to the collision position is larger than the second threshold value.

According to the above-described aspect, the collision detection device is configured such that, because of the placement of the pair of pressure detectors, the detection value of the pressure detector that is positioned closer to the collision position reaches the second threshold value after the detection value of the pressure detector that is positioned farther away from the collision position of the collision body has reached the first threshold value. Additionally, the collision determination unit determines that a collision has occurred when the detection value resulting from the pressure detector that is positioned farther away from the collision position is larger than the first threshold value and the detection value resulting from the pressure detector that is positioned closer to the collision position is larger than the second threshold value. For this reason, the collision determination time is dependent on the detection time of the pressure detector that is positioned closer to the collision position (the amount of time until its detection value reaches the second threshold value) and is not dependent on the detection time of the pressure detector that is positioned farther away from the collision position (the amount of time until its detection value reaches the first threshold value). Because of this, the collision detection device can determine in a shorter amount of time a collision to each lengthwise direction section of the chamber member while its reliability is improved.

In the above-described aspect, the collision detection device may be given a configuration where one of the pair of pressure detectors is placed in a central section between the lengthwise direction central section and one lengthwise direction end portion of the chamber member and the other of the pair of pressure detectors is placed in a central section between the lengthwise direction central section and the other lengthwise direction end portion of the chamber member.

According to the above-described aspect, the one pressure detector is placed in a position substantially ¼ of a chamber member length L away from the one lengthwise direction end portion of the chamber member. Further, the other pressure detector is placed in a position a distance of substantially L/4 away from the other lengthwise direction end portion of the chamber member. For this reason, no matter which position in the lengthwise direction of the chamber member the collision body has impacted, the collision position of the collision body with respect to the pressure chamber becomes positioned in a range where the distance from the pressure detector that is closer is substantially within L/4. Because of this, the collision detection device can determine in a shorter amount of time a collision to each lengthwise direction section of the chamber member.

Further, the difference between the distances from the collision position of the collision body to each pressure detector is a maximum of substantially L/2, so even in a configuration where the timing when the detection value of each pressure detector reaches the first and second threshold values is set like in claim 2, the first threshold value can be set relatively large, which contributes to an improvement in reliability.

Advantageous Effects of the Invention

As described above, the collision detection device pertaining to the present invention has the excellent effect that it can determine in a short amount of time a collision to each lengthwise direction section of a chamber member and its reliability is high.

BRIEF DESCRIPTION OF THE DRAWINGS

FIG. 5 is a chart showing the relationship between effective mass and first and second threshold values in a collision determination system pertaining to a modification of the embodiment of the present invention.

FIG. 7 is a chart showing one example of the relationship between the amount of crushing and the reaction force of the absorber configuring the collision determination system pertaining to the modification of the embodiment of the present invention.

BEST MODE FOR CARRYING OUT THE INVENTION

Figure 1:
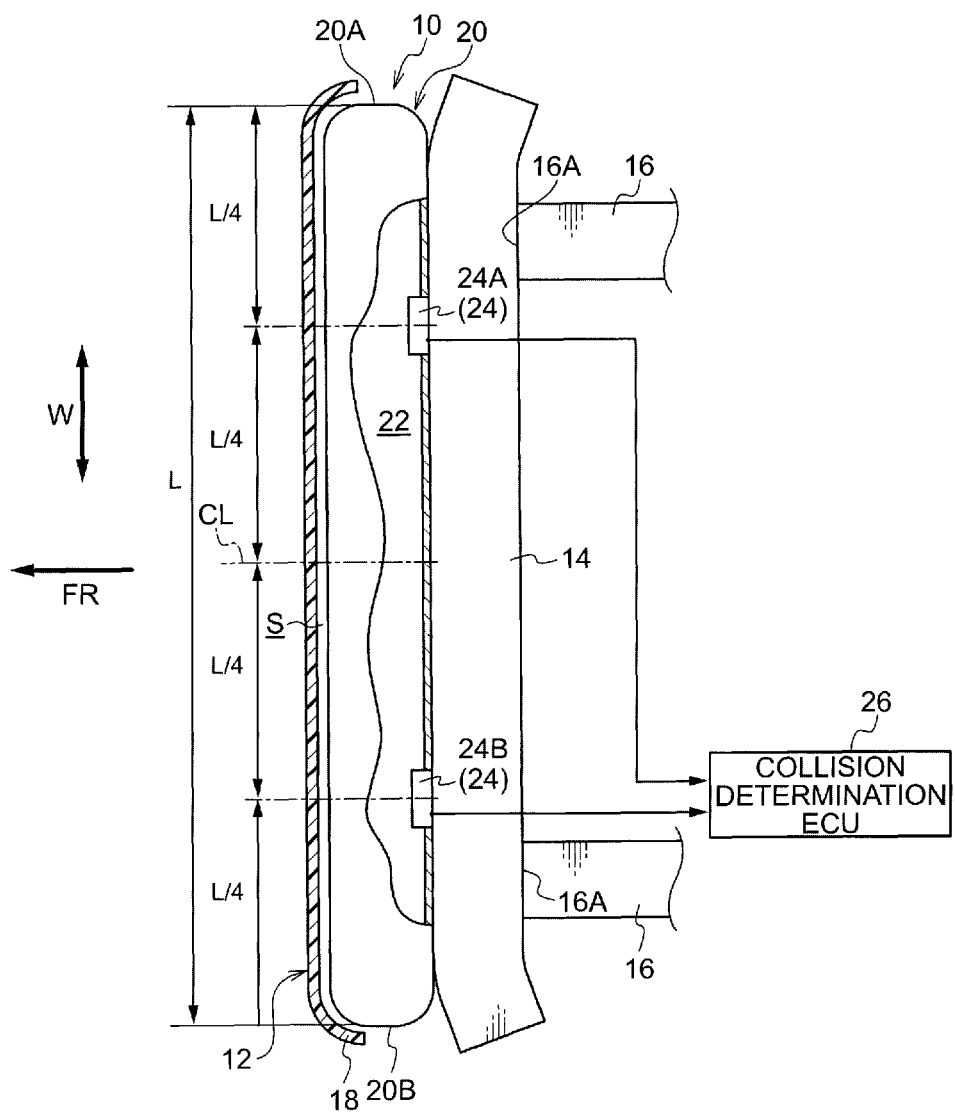
FIG. 1 is a plan sectional view showing the general overall configuration of a collision determination system pertaining to an embodiment of the present invention.

A collision determination system 10 serving as a collision detection device pertaining to an embodiment of the present invention will be described on the basis of FIG. 1 to FIG. 4. Arrow FR shown in the drawings will denote a front direction (traveling direction) in a vehicle body front-rear direction and arrow W will denote a vehicle width direction.

In FIG. 1, the general overall configuration of the collision determination system 10 is shown in a partial cutaway schematic plan sectional view. As shown in this drawing, the collision determination system 10 is applied to a front bumper 12 placed on a front end of an automobile in which the system is applied and discriminates (whether or not there is) a collision to the front bumper 12. This will be described specifically below.

The front bumper 12 is equipped with a bumper reinforcement 14 serving as a bumper frame member. The bumper reinforcement 14 comprises a ferrous or aluminum metal material, for example, and is configured as a frame member that is long in the vehicle width direction. This bumper reinforcement 14 bridges front ends 16A of a left and right pair of front side members 16 configuring frame members of the vehicle body and is supported with respect to the vehicle body.

Further, the front bumper 12 is equipped with a bumper cover 18 that covers the bumper reinforcement 14 from its outer side—that is, its front side—in the vehicle front-rear direction. The bumper cover 18 is configured by a resin material or the like and is fixedly supported with respect to the vehicle body at unillustrated portions such that a space S is formed between the bumper cover 18 and the bumper reinforcement 14.

Additionally, a chamber member 20 is placed inside the space S between the bumper reinforcement 14 and the bumper cover 18 in the front bumper 12. The chamber member 20 is configured as a hollow structure that is long in the vehicle width direction and is fixedly attached to the front surface of the bumper reinforcement 14. The positions of both lengthwise direction ends of the chamber member 20 substantially coincide with the positions of both ends of the bumper reinforcement 14.

This chamber member 20 has a rigidity that is capable of maintaining the shape (hollow sectional shape) of the chamber member 20 in a state where the chamber member 20 is fixedly attached to the bumper reinforcement 14 as described above and has a communicating hole communicated with the atmosphere in an unillustrated position. Consequently, the chamber member 20 has a configuration where normally (statically) the inside of a pressure chamber 22 that is the inside space of the chamber member 20 is made equal to the atmospheric pressure. This chamber member 20 is configured such that, when it receives a relatively small compressive load from the vehicle front side, it is crushed while letting out air from the communicating hole and the volume of the pressure chamber 22 is reduced while the internal pressure of the pressure chamber 22 is allowed to dynamically vary.

Moreover, the collision determination system 10 is equipped with a pair of pressure sensors 24 serving as pressure detectors that output signals corresponding to the pressure of the pressure chamber 22. The pressure sensors 24 are given a configuration where they output the same signals with respect to the same pressure and are given a configuration where they output signals corresponding to the pressure inside the pressure chamber 22 to a later-described ECU 26. In the description below, when distinguishing between the pressure sensors 24, for the sake of convenience sometimes one of the pressure sensors 24 will be called a first pressure sensor 24A and the other of the pressure sensors 24 will be called a second pressure sensor 24B.

These pressure sensors 24 are placed so as to be bilaterally symmetrical with respect to a centerline CL that equally divides the chamber member 20 in its lengthwise direction. More specifically, the first pressure sensor 24A is placed in a central section between one lengthwise direction end 20A of the chamber member 20 and the centerline CL. Further, the second pressure sensor 24B is placed in a central section between another lengthwise direction end 20B of the chamber member 20 and the centerline CL. In other words, assuming that L represents the entire length of the chamber member 20 along the vehicle width direction, the first pressure sensor 24A is placed in a position where its distance from the one lengthwise direction end 20A of the chamber member 20 is equal to L/4. Further, the second pressure sensor 24B is placed in a position where its distance from the other lengthwise direction end 20B of the chamber member 20 is equal to L/4.

Consequently, the collision determination system 10 is given a configuration where, no matter which position in the lengthwise direction of the front bumper 12—that is, the chamber member 20—the collision body has impacted, at least one of the pair of pressure sensors 24 is positioned within a distance of L/4 from the collision position CP. Further, the collision determination system 10 has a configuration where the difference between the distances from the pair of pressure sensors 24 to the collision position CP is within L/2 (in the range of 0 to L/2).

Further, in this embodiment, an unillustrated absorber is fixed under the chamber member 20 on the front surface of the bumper reinforcement 14. The absorber is compressively deformed with respect to a frontal collision and absorbs the shock energy. Consequently, the collision determination system 10 has a configuration where the chamber member 20 is compressed such that the volume of the pressure chamber 22 decreases as the absorber is compressively deformed. A clearance is set between the absorber and the chamber member 20, and the deformation of the chamber member 20 is not restricted by the absorber. Further, the reaction force that the chamber member 20 produces at the time of a frontal collision is sufficiently small with respect to the reaction force that the absorber produces.

An ECU 26 serving as a collision determination unit determines (whether or not there is) a collision to the front bumper 12 on the basis of the output signals from the pressure sensors 24. In this embodiment, the ECU 26 determines (whether or not there is) a collision to the front bumper 12 on the basis of pressure waveforms that are the detection values of the two pressure sensors 24 shown in FIG. 2. This will be described specifically below.

A first threshold value Pt1 and a second threshold value Pt2 (>Pt1) that is a larger value than this first threshold value Pt1 are set in the ECU 26. This ECU 26 is given a configuration where it determines that a collision body has impacted the front bumper 12 when either one of a first detection value P1 of the first pressure sensor 24A and a second pressure detection value P2 of the second pressure sensor 24B exceeds the first threshold value Pt1 and the other of the first detection value P1 and the second pressure detection value P2 exceeds the second threshold value Pt2.

Figure 2:
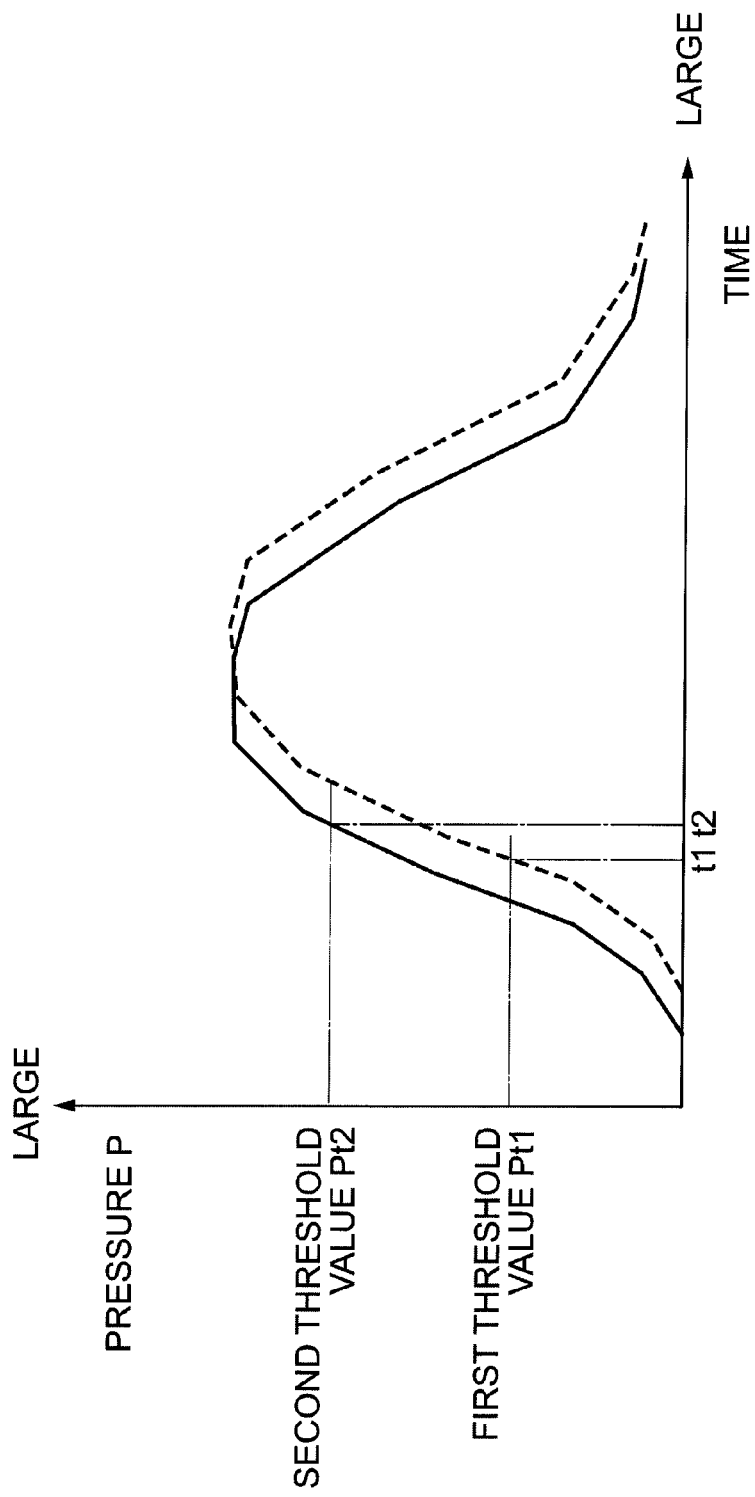
FIG. 2 is a chart showing the relationship between pressure waveforms and first and second threshold values in the collision determination system pertaining to the embodiment of the present invention.

More specifically, the ECU 26 is given a configuration where it determines that a collision body has impacted the front bumper 12 when the following two conditions are both met. The first condition is one where the detection value P of the pressure sensor 24 of the pair of pressure sensors 24 that is positioned relatively farther away from the collision position CP where the collision body impacts the chamber member 20 exceeds the first threshold value Pt1. The second condition is one where the detection value P of the pressure sensor 24 of the pair of pressure sensors 24 that is positioned relatively closer to the collision position CP exceeds the second threshold value Pt2. One example of the flow of the collision determination by this ECU 26 will be described later together with the action of the present embodiment. In FIG. 2, the solid line represents the detection value P—that is, the pressure waveform—of the pressure sensor 24 that is closer to the collision position CP, and the broken line represents the detection value P—that is, the pressure waveform—of the pressure sensor 24 that is farther from the collision position CP.

Additionally, the collision determination system 10 is given a configuration where, no matter which position in the lengthwise direction of the chamber member 20 a collision to the front bumper 12 that should be detected has occurred, the detection value P of the pressure sensor 24 that is farther away from the collision position CP reaches the first threshold value Pt1 before the detection value P of the pressure sensor 24 that is closer to the collision position CP reaches the second threshold value Pt2. This configuration is configured by the placement of the pair of pressure sensors 24 and the setting of the values of the first threshold value Pt1 and the second threshold value Pt2. That is, in the collision determination system 10, an amount of elapsed time t1 from the start of the collision to until the detection value P of the pressure sensor 24 that is farther away from the collision position CP reaches the first threshold value Pt1 is set so as to become shorter than an amount of elapsed time t2 from the start of the collision to until the detection value P of the pressure sensor 24 that is closer to the collision position CP reaches the second threshold value Pt2.

Next, the action of the present embodiment will be described while referring to the flowchart shown in FIG. 3.

In the collision determination system 10 of the above-described configuration, in a state where a main switch of the vehicle (automobile) in which the system is applied is ON, the ECU 26 first reads the signal of the first pressure sensor 24A in step S10 and then judges whether or not the first detection value P1 exceeds the first threshold value Pt1 in step S12. When the ECU 26 judges that the first detection value P1 does not exceed the first threshold value Pt1, it returns to step S10 and repeats the above action until the first detection value P1 exceeds the first threshold value Pt1. This is because, if the collision position CP is closer to the first pressure sensor 24A, the second pressure detection value P2 will not reach the first threshold value Pt1 before the first detection value P1 reaches the first threshold value Pt1. On the other hand, if the collision position CP is closer to the second pressure sensor 24B, it suffices for the ECU 26 to judge (in step S16 described later) whether or not the second pressure detection value P2 exceeds the second threshold value Pt2 after the first detection value P1 has exceeded the first threshold value Pt1.

When the ECU 26 judges in step S10 that the first detection value P1 exceeds the first threshold value Pt1, it proceeds to step S14 and reads the signal of the second pressure sensor 24B. Next, in step S16, the ECU 26 judges whether or not the second detection value P2 exceeds the second threshold value Pt2. When the ECU 26 judges in step S16 that the second detection value P2 exceeds the second threshold value Pt2, it determines in step 18 that a collision that should be detected has occurred on the front bumper 12.

That is, the ECU 26 determines the occurrence of a collision as a result of the two conditions of the first detection value P1 of the first pressure sensor 24A exceeding the first threshold value Pt1 (step S12) and the second pressure detection value P2 of the second pressure sensor 24B exceeding the second threshold value Pt2 (step S16) being met. In this case, the ECU 26 can also determine that the collision position CP is on the second pressure sensor 24B side.

When the ECU 26 judges in step S16 that the second detection value P2 does not exceed the second threshold value Pt2, it proceeds to step S20 and judges whether or not the second detection value P2 exceeds the first threshold value Pt1. When the ECU 26 judges in step S20 that the second detection value P2 does not exceed the first threshold value Pt1, it returns to step S10.

When the ECU 26 judges in step S20 that the second detection value P2 exceeds the first threshold value Pt1, it proceeds to step S22 and reads the signal of the first pressure sensor 24A. Next, the ECU 26 judges in step S24 whether or not the first detection value P1 exceeds the second threshold value Pt2. When the ECU 26 judges in step S20 that the first detection value P1 does not exceed the second threshold value Pt2, it returns to step S10.

Then, when the ECU 26 judges in step S24 that the first detection value P1 exceeds the second threshold value Pt2, it determines that a collision that should be detected has occurred on the front bumper 12. That is, the ECU 26 determines the occurrence of a collision as a result of the two conditions of the second detection value P2 of the second pressure sensor 24B exceeding the first threshold value Pt1 (step S20) and the first detection value P1 of the first pressure sensor 24A exceeding the second threshold value Pt2 (step S24) being met in steps S20 and S24. In this case, the ECU 26 can also determine that the collision position CP is on the first pressure sensor 24A side.

Figure 4A:
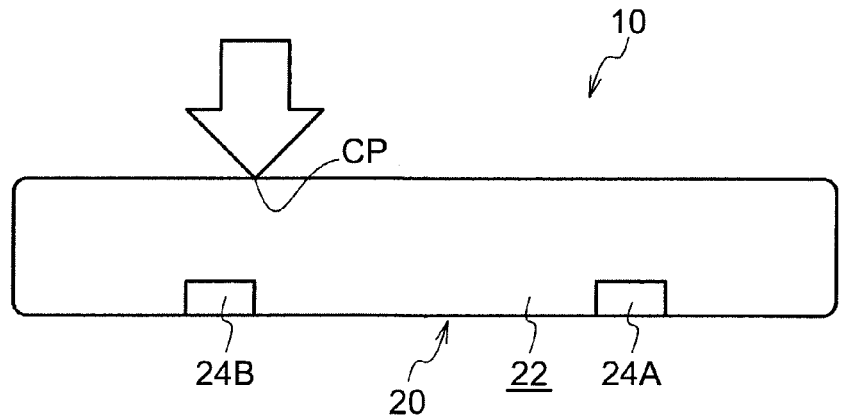
FIG. 4A is a schematic diagram showing a state of a collision to one lengthwise direction side of a chamber member that represents a collision mode that the ECU configuring the collision determination system pertaining to the embodiment of the present invention should determine.

The flow of the collision determination by the ECU 26 described above will be further described on the basis of cases shown in FIG. 4 where a collision has occurred. For example, as shown in FIG. 4A, when the collision position CP is positioned on the second pressure sensor 24B side, the conditions of the collision determination are met by a YES in step S12 and a YES in step S16. Because of this, a collision to the second pressure sensor 24B side is determined as described above.

Figure 4B:
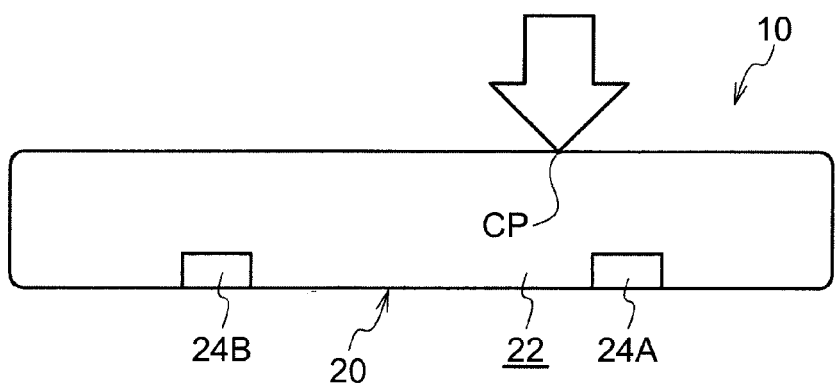
FIG. 4B is a schematic diagram showing a state of a collision to one lengthwise direction side of the chamber member that represents a collision mode that the ECU configuring the collision determination system pertaining to the embodiment of the present invention should determine.

On the other hand, as shown in FIG. 4B, when the collision position CP is positioned on the first pressure sensor 24A side, the first detection value P1 rises in a shorter amount of time than P2 as shown in FIG. 2. Consequently, a YES condition is met in step S20 after a YES in step S12. The conditions of the collision determination are met by this YES in step S20 and a YES in step S24. Because of this, a collision to the first pressure sensor 24A side is determined as described above.

Here, in the collision determination system 10, the two pressure sensors 24 are disposed apart from each other in the vehicle width direction with respect to the one chamber member 20. In particular, in the collision determination system 10, the pressure sensors 24 are placed in a position substantially L/4 from the one lengthwise direction end 20A of the chamber member 20 and in a position substantially L/4 from the other lengthwise direction end 20B of the chamber member 20. Because of these, the pressure sensors 24 become positioned a distance substantially within L/4 from the position CP of the collision to the front bumper 12—that is, the chamber member 20. For this reason, the collision determination system 10 can determine a collision (P1>Pt2 or P2>Pt2) in a short amount of time from the collision.

Further, here, in the collision determination system 10, a redundant system can be configured because the two pressure sensors 24 are disposed apart from each other in the vehicle width direction with respect to the one chamber member 20. That is, in the collision determination system 10, one of the pressure sensors 24 can be used for main collision determination (the comparison with the second threshold value Pt2) and the other of the pressure sensors 24 can be used for ensuring redundancy (the comparison with the first threshold value Pt1) with respect to a frontal collision to the front bumper 12.

Moreover, it is not necessary to dispose a dedicated sensor for configuring a redundant system because, of the two pressure sensors 24 for determining a collision in a short amount of time as described above, the pressure sensor 24 that is closer to the collision position CP is used as a main sensor and the pressure sensor 24 that is farther from the collision position CP is used as a redundant system (safing) sensor.

Further, the first threshold value Pt1 for ensuring redundancy is decided such that the detection value P of the pressure sensor 24 that is farther from the collision position CP reaches the first threshold value Pt1 before the detection value P of the pressure sensor 24 that is closer to the collision position CP reaches the second threshold value Pt2. For this reason, in the collision determination system 10, configuring the redundant system does not affect the amount of time required for the collision determination (P1>Pt2 or P2>Pt2) by the main sensor.

Moreover, the first threshold value Pt1 can be set to a more appropriate value because the difference between the distances from the collision position CP to the two pressure sensors 24 is substantially within the range of L/2 as described above. That is, in a configuration where the difference between the distances from the collision position CP to the two pressure sensors 24 is large (e.g., in a configuration where the pressure sensors 24 are placed on both ends of the chamber member 20, the distance difference becomes L), the first threshold value Pt1 becomes set small. In contrast, in the collision determination system 10, an appropriate first threshold value Pt1 sufficient for configuring a redundant system contributing to an improvement in reliability can be set.

In other words, the collision determination system 10 can be apprehended as one where the placement of these pressure sensors 24 is decided such that the detection value P of the pressure sensor 24 that is farther from the collision position CP reaches the first threshold value Pt1 sufficient for configuring a redundant system contributing to an improvement in reliability before the detection value P of the pressure sensor 24 that is closer to the collision position CP reaches the second threshold value Pt2.

As described above, the collision determination system 10 pertaining to the embodiment of the present invention can determine in a short amount of time a collision to each lengthwise direction section of the chamber member 20 and its reliability is high. Further, in the collision determination system 10 of the above-described configuration, even if the collision position CP coincides with the lengthwise direction centerline CL of the chamber member 20, one of the pair of pressure sensors 24 functions as a main sensor and the other functions as a safing sensor, so the collision determination system 10 can precisely determine a collision in a short amount of time.

In the embodiment described above, an example where the ECU 26 determines a collision using pressure waveforms as the detection values P of the pressure sensors 24 has been described, but the present invention is not limited to this and may also be configured to determine a collision using detection values obtained by converting the pressure in the chamber member 20 to another physical quantity or the like. Consequently, for example, as shown in FIG. 5, the present invention may also be configured to determine a collision using as detection values M an effective mass m obtained from the output signals (pressure waveforms) from the pressure sensors 24.

In this case, the ECU 26 determines a collision using as conditions the detection value M of the pressure sensor 24 that is farther from the collision position CP exceeding a first threshold value Mt1 and the detection value M of the pressure sensor 24 that is closer to the collision position CP exceeding a second threshold value Mt2.

To further describe the effective mass m, assuming that F(t) represents the collision load and v represents the collision velocity, the impulse at the time of a collision is:

$$m \times v = \int F(t) dt$$

So the effective mass m can be obtained as in the following expression by dividing the time-integrated value of the collision load by the collision velocity:

$$m = \int F(t) dt / v \qquad (1)$$

Consequently, in obtaining the effective mass m, it is necessary to calculate the collision load F(t) from the pressure waveform of the pressure chamber 22 and obtain the collision velocity v on the basis of information from, for example, a vehicle velocity sensor or a distance sensor (a millimeter-wave radar, etc.) for collision prediction. The calculation of the collision load F(t) will be further described.

Figure 6A:
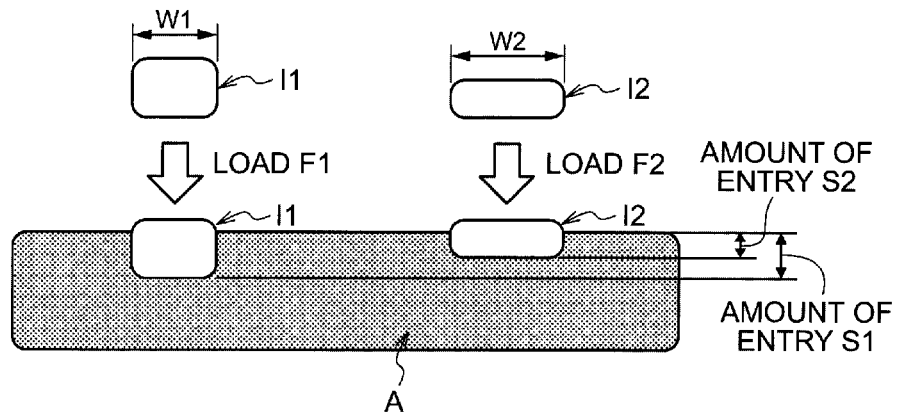
FIG. 6A is a diagram for describing the characteristic of an absorber configuring the collision determination system pertaining to the modification of the embodiment of the present invention and is a diagram schematically showing deformation resulting from collisions of collision bodies.

Here, in the present modification, the collision load F is proportional to an entry volume V of the collision body into the absorber accompanying the collision, and assuming that this entry volume substantially corresponds to (substantially coincides with) a volume change ΔV in the chamber member 20, the entry volume can be calculated on the basis of the outputs of the pressure sensors 24 corresponding to the volume change ΔV in the chamber member 20. Specifically, at least the absorber pertaining to the present modification is configured by a material where the entry volume V accompanying the collision of a collision body I is substantially proportional to the collision load F. For example, as shown in FIG. 6A, assuming that S1 represents the amount of entry (depth) of a collision body I1 with a width in the vehicle width direction of W1 into an absorber 20 when the collision body I1 impacts with a load F1, and assuming that a represents a proportional constant, V1 represents the entry volume, and H represents the height of the absorber 20 in the vehicle vertical direction, then they become:

$$F1 = \alpha \times W1 \times H \times S1 = \alpha \times V1$$

Similarly, assuming that S2 represents the amount of entry of a collision body I2 with a width in the vehicle width direction of W2 into the absorber A when the collision body I2 impacts with a load F2, and assuming that α represents a proportional constant and V2 represents the entry volume, then they become:

$$F2 = \alpha \times W2 \times H \times S2 = \alpha \times V2$$

Figure 6B:
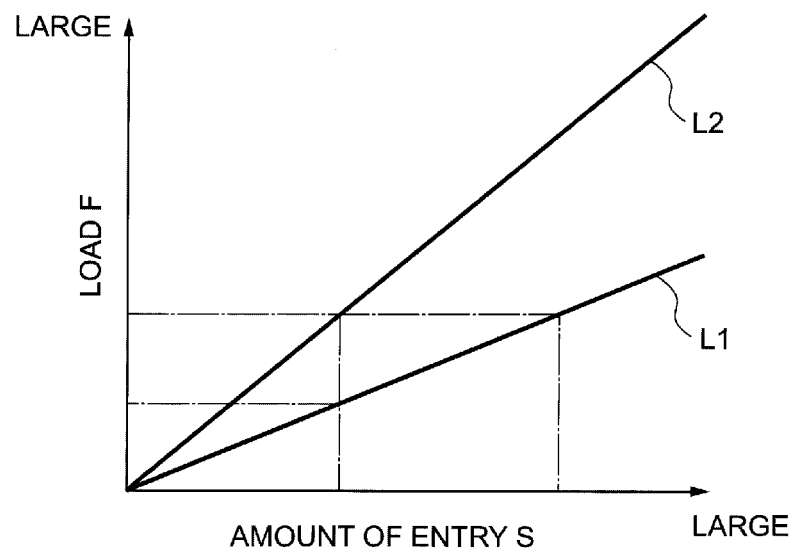
FIG. 6B is a diagram for describing the characteristic of the absorber configuring the collision determination system pertaining to the modification of the embodiment of the present invention and is a diagram conceptually showing the relationship between amounts of entry and loads of collision bodies.

Consequently, if the absorber A is configured by a material with the characteristic that the reaction force and the amount of entry are in a substantially proportional relationship as shown in FIG. 7, then the load and the volume change become proportional (a becomes a constant) regardless of the width of the collision body I in the absorber A as shown conceptually in FIG. 6B. That is, in the absorber A configuring the collision determination system 10, the following relationship is established:

$$F1/F2 = V1/V2$$

In FIG. 6B, straight line L1 represents the relationship between the amount of entry S and the load F (reaction force) when the collision body I1 of width W1 impacts, and straight line L2 represents the relationship between the amount of entry S and the load F (reaction force) when the collision body I2 of width W2 (>W1) impacts. From this drawing, it will be understood that, when the load F is constant, the amount of entry S is large in the collision body I1 whose width is relatively small and the amount of entry S becomes smaller in the collision body I2 whose width is relatively large. FIG. 7 shows, in regard to samples whose expansion ratios were varied, characteristics when collision bodies I with a constant width have been made to impact.

In the configuration described above where the absorber A and the chamber member 20 are juxtaposed and placed with a clearance between them vertically on the front side of the bumper reinforcement 14, the deformation of the chamber member 20 is not restricted by the absorber A as described above. Because of this, in the collision determination system 10, when a collision body I that is long in the vehicle vertical direction impacts the front bumper 12, the width and the amount of entry of the collision body I with respect to the chamber member 20 substantially coincide with the width and the amount of entry of the collision body I with respect to the absorber A. For this reason, in the collision determination system 10, in principle the volume change ΔV in the chamber member 20 accompanying a collision to the front bumper 12 is substantially proportional to the entry volume V of the collision body I into the absorber A—that is, the collision load F (F ∝ α × ΔV).

On the other hand, assuming that V0 represents the initial volume of the pressure chamber 22 inside the chamber member 20, P0 represents the initial pressure, and ΔP represents the pressure change, then there is the relationship:

$$P0 \times V0 = (P0 + \Delta P) \times (V0 - \Delta V)$$

Consequently, ΔV corresponding to the entry volume V into the absorber A can be obtained as:

$$\Delta V = V0 \times \Delta P / (P0 + \Delta P)$$

In the ECU 26 pertaining to this modification, the initial volume V0 is stored (set) beforehand and the initial pressure P0 is stored beforehand as standard atmospheric pressure. Additionally, in this modification, the proportional constant α (e.g., α=50) described above is set and the collision load F is calculated as described below.

$$F = \alpha \times V0 \times \Delta P / (P0 + \Delta P) \qquad (2)$$

In this modification, the ECU 26 is given a configuration where it uses a value corrected as described below as the pressure change ΔP inside the pressure chamber 22. Here, P0s represents a time-of-measurement atmospheric pressure obtained on the basis of the signals from the pressure sensors 24, and Ps represents a measured pressure obtained on the basis of the signals from the pressure sensors.

$$\Delta P = (Ps - P0s) \times (P0/P0s) \tag{5}$$

By applying expression (2) described above to expression (1), the effective mass m—that is, the detection values M of the pair of pressure sensors 24—can be obtained. The comparison between the detection values M and the first threshold value Mt1 and the second threshold value Mt2 can be executed by the same flow as the flow shown in FIG. 3, for example.

A modification where the effective mass m serves as the detection values M has been described, but the present invention is not limited to this and may also, for example, be given a configuration where it determines a collision using detection values obtained by simply time-integrating the pressure waveforms (the detection values P).

Figure 3:
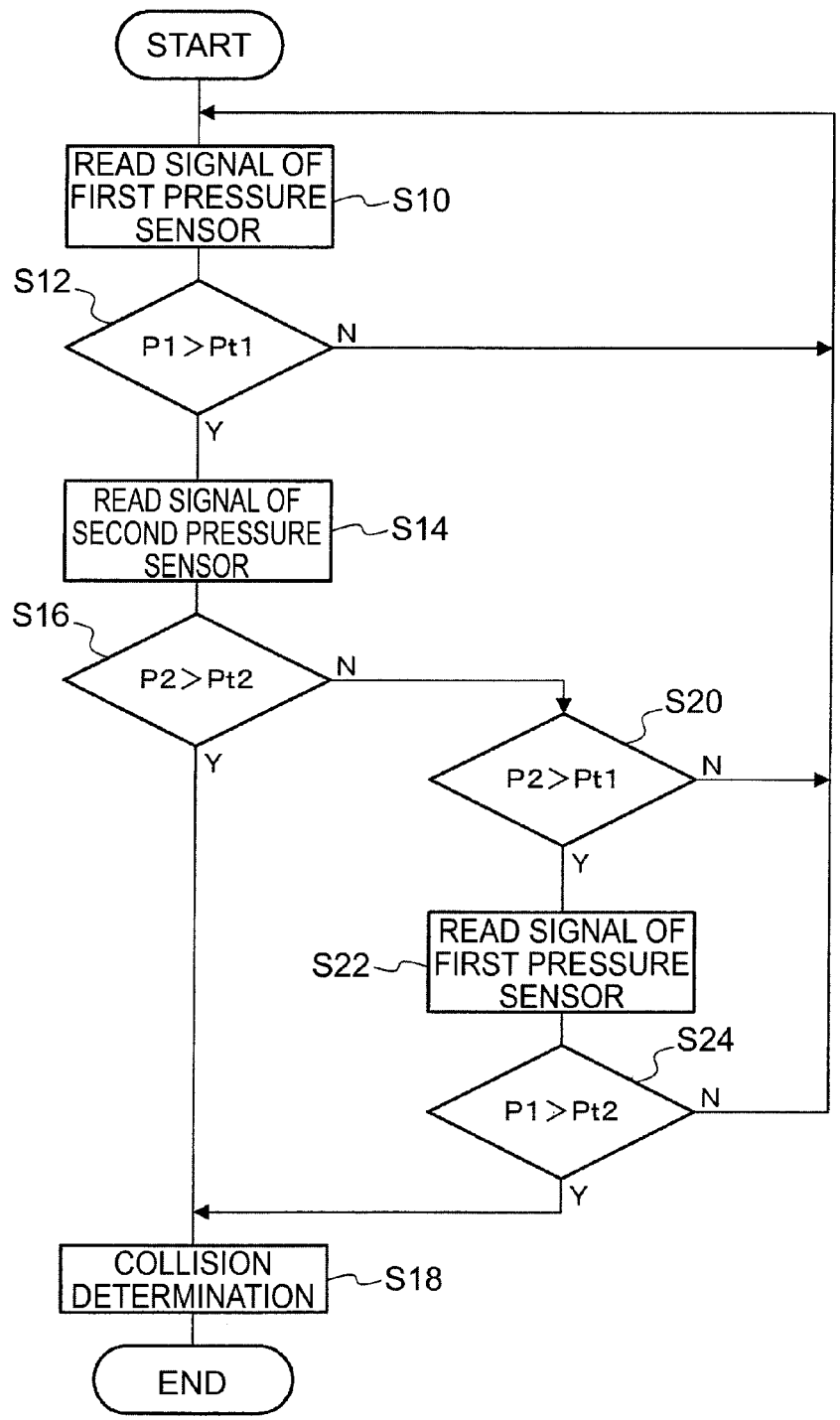
FIG. 3 is a flowchart showing a collision determination flow of an ECU configuring the collision determination system pertaining to the embodiment of the present invention.

Further, in the embodiment and the modification described above, an example where the collision determination system determines a collision by the flow shown in FIG. 3 has been described, but the present invention is not limited to this, and it goes without saying that the collision determination system can determine a collision by various flows. Further, the present invention is not limited to a configuration where the collision determination system determines a collision with only the two pressure sensors 24 and may also be given a configuration using a sensor for detecting to which of the left and right pressure sensors 24 the collision position CP is closer. In this configuration, the collision determination system can, for example, be configured to first read the signal of the pressure sensor 24 that is farther from the collision position CP, compare the detection value with the first threshold value Pt1, and, when the ECU determines that the detection value exceeds the first threshold value Pt1, read the signal of the other pressure sensor 24 and compare the detection value with the second threshold value Pt2.

Moreover, in each of the embodiments described above, an example where the collision determination systems 10 to 80 are applied to the front bumper 12 has been described, but the present invention is not limited to this and may also, for example, be applied to a rear bumper with each of the configurations described above being reversed.

The invention claimed is:

1. A collision detection system comprising:
   a chamber member that is made long in a vehicle width direction, whose inside is made into a pressure chamber, and which is placed on an outer side in a vehicle front-rear direction with respect to a bumper frame member;
   a pair of pressure detectors that are placed in positions apart from each other in the lengthwise direction of the chamber member and output signals corresponding to pressure changes inside the pressure chamber; and
   a collision determination unit that determines that a collision has occurred when the detection value resulting from either one of the pair of pressure detectors is larger than a first threshold value and the detection value resulting from the other of the pair of pressure detectors is larger than a second threshold value set to a large value with respect to the first threshold value, wherein
   the pair of pressure detectors are placed symmetrically with respect to a lengthwise direction central section of the chamber member,
   the first and second threshold values are set in the collision determination unit such that, when a collision from the outer side in the vehicle front-rear direction toward the bumper frame member has occurred, the detection value resulting from the pressure detector of the pair of pressure detectors that is positioned closer to the collision position reaches the second threshold value after the detection value resulting from the pressure detector of the pair of pressure detectors that is positioned farther away from the collision position has reached the first threshold value, and
   the collision determination unit is configured to determine that a collision has occurred when the detection value resulting from the pressure detector of the pair of pressure detectors that is positioned farther away from the collision position is larger than the first threshold value and the detection value resulting from the pressure detector of the pair of pressure detectors that is positioned closer to the collision position is larger than the second threshold value.

2. The collision detection device according to claim 1, wherein
   one of the pair of pressure detectors is placed in a central section between the lengthwise direction central section and one lengthwise direction end portion of the chamber member and
   the other of the pair of pressure detectors is placed in a central section between the lengthwise direction central section and the other lengthwise direction end portion of the chamber member.

* * * * *